United States Patent [19]
Ollis

[11] Patent Number: 5,614,119
[45] Date of Patent: Mar. 25, 1997

[54] NO FREEZE PROTECTION DEVICE FOR AN OUTDOOR FAUCET

[76] Inventor: Calvin G. Ollis, 7287 Cara Bend, Olive Branch, Miss. 38654

[21] Appl. No.: 419,426

[22] Filed: Apr. 10, 1995

[51] Int. Cl.⁶ .............................. F16K 49/00; E03B 7/12
[52] U.S. Cl. .................. 219/385; 219/213; 392/416; 137/341; 138/33
[58] Field of Search .................... 219/385, 213, 219/523, 524; 392/416, 432, 435, 436; 137/341, 375; 138/33

[56] References Cited

U.S. PATENT DOCUMENTS

| | | | |
|---|---|---|---|
| Re. 33,523 | 1/1991 | Devine | 137/375 |
| D. 346,432 | 4/1994 | Van Meter | D23/249 |
| 1,735,165 | 11/1929 | Hornby | 219/523 |
| 2,056,156 | 10/1936 | Buckingham et al. | 392/416 |
| 2,650,180 | 8/1953 | Walker | 137/375 |
| 2,686,530 | 8/1954 | Dire | 137/375 |
| 3,913,602 | 10/1975 | Yoon | 137/375 |
| 4,071,043 | 1/1978 | Carlson | 137/375 |
| 4,084,270 | 4/1978 | Kersten | 4/145 |
| 4,103,701 | 8/1978 | Jeng | 137/375 |
| 4,380,245 | 4/1983 | Hefner | 137/375 |
| 4,456,027 | 6/1984 | Belgard | 137/375 |
| 4,726,394 | 2/1988 | Devine | 137/375 |
| 5,349,992 | 9/1994 | Gallo et al. | 141/18 |

Primary Examiner—Teresa J. Walberg
Assistant Examiner—J. Pelham
Attorney, Agent, or Firm—Michael I. Kroll

[57] ABSTRACT

A no freeze protection device for an outdoor faucet on an exterior wall of a building. The protection device comprises an enclosure to fit about the outdoor faucet. A facility is for mounting the enclosure to the exterior wall about the outdoor faucet. A component is for supplying heat within the enclosure to the outdoor faucet, to prevent water within the outdoor faucet from freezing during cold weather.

2 Claims, 2 Drawing Sheets

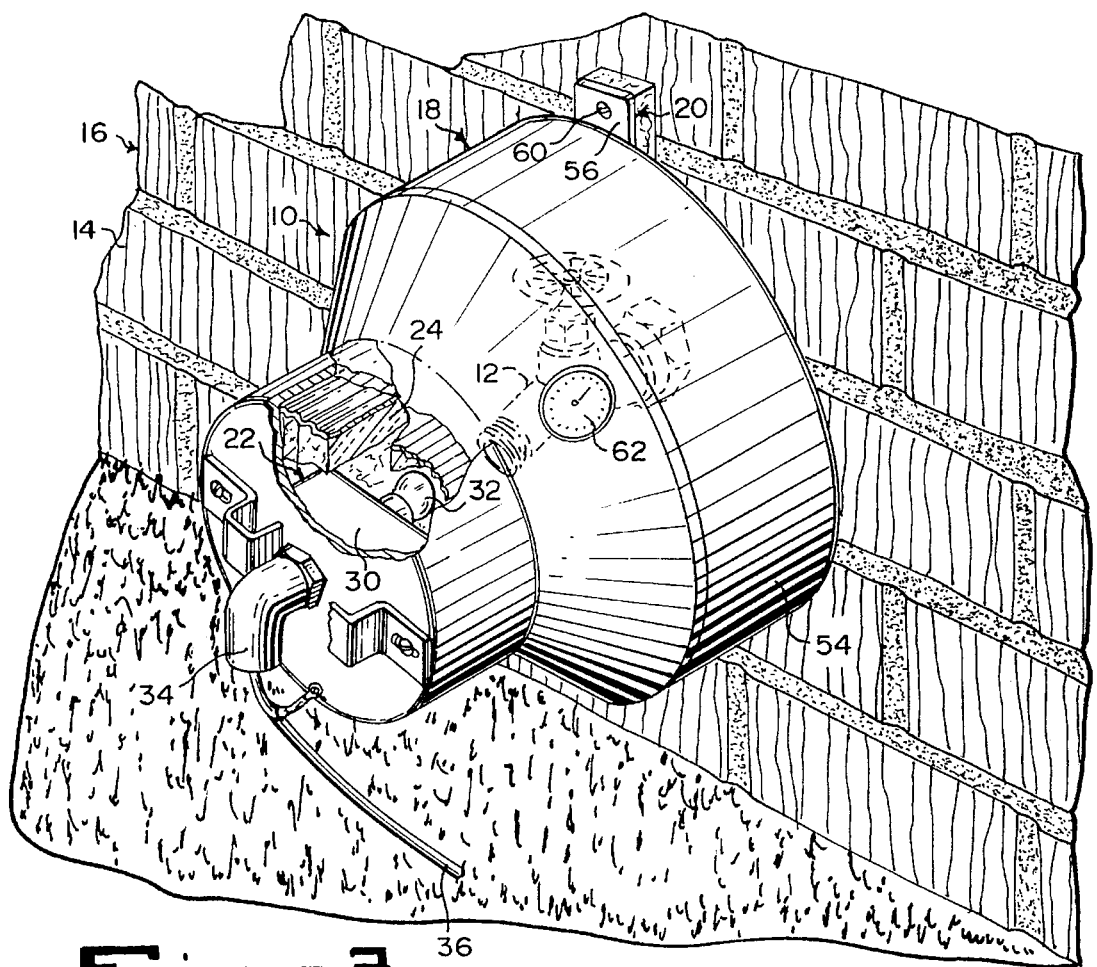
Fig.3
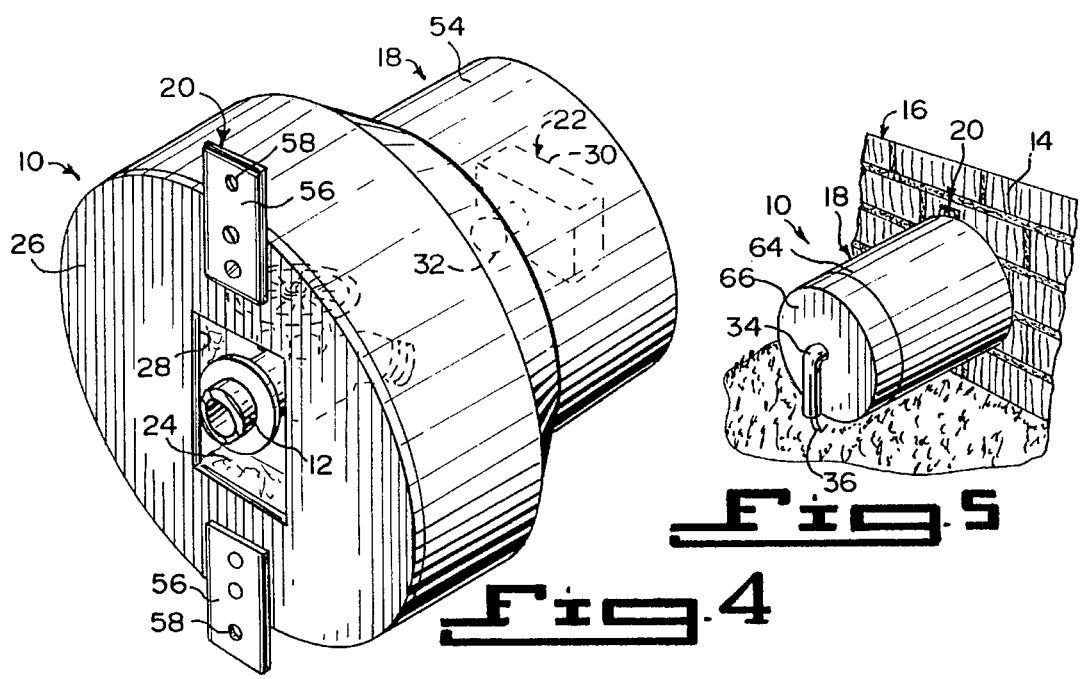
Fig.4
Fig.5

NO FREEZE PROTECTION DEVICE FOR AN OUTDOOR FAUCET

BACKGROUND OF THE INVENTION

1. Field of the Invention

The instant invention relates generally to heaters and more specifically it relates to a no freeze protection device for an outdoor faucet.

2. Description of the Prior Art

Numerous heaters have been provided in prior art. For example, U.S. Pat. No. 1,136,365 to Quinlan; U.S. Pat. No. 1,692,321 to Zisch; U.S. Pat. No. 1,908,114 to Cante and U.S. Pat. No. 2,879,372 to Dammond all are illustrative of such prior art. While these units may be suitable for the particular purpose to which they address, they would not be as suitable for the purposes of the present invention as heretofore described.

QUINLAN, CHARLES H.

ELECTRIC WATER HEATER

U.S. Pat. No. 1,136,365

The combination with a faucet, of a water heating device consisting of an exterior cylindrical receptacle with a top having a threaded opening arranged to be screwed on to the end of the faucet. A centrally disposed outlet is at its bottom. An inner cylindrical receptacle with legs is arranged to rest on the bottom of the outer receptacle. A third innermost cylindrical receptacle is carried by the bottom of the second named receptacle and is provided with openings near its bottom for communication with the interior of the second named receptacle. The inlet end of the faucet is directly above the center of the innermost receptacle. An electric heating coil surrounds the innermost receptacle. A conduit extends through the walls of the outer receptacle and the second named receptacle for housing the terminals of the coil.

ZISCH, GEORGE J.

INSTANTANEOUS ELECTRIC WATER HEATER

U.S. Pat. No. 1,692,321

An electric water heater comprising a cylindrical body having a means to connect with a water supply source. The body has a conical chamber and an opening leading thereto. A cover is on the open end of the body. A hollow tapered plug has a raised helix on its periphery fitting the chamber. A high resistance wire coil is disposed in the grooves of the helix. A snap switch controls current to the coil, a valve controls the passage of water through the helical grooves. The valve has a stem extending through the cover. A handle is thereon. An outlet on the body is in communication with the groove most remote from the water inlet. A means actuated by the valve handle operates the switch.

CANTE, CORNELIUS

ELECTRICAL HEATER FOR CIRCULATING WATER

U.S. Pat. No. 1,908,114

An electric heater for circulating water comprising a water container. An electric heating member is mounted with the water container. An electric circuit is for supplying current to the heating member. A switch is in the circuit. A water inlet is to the container. The inlet is located in the bottom of the container. A valve is for closing the inlet. A discharge orifice is to the water container. A whistle is located in the orifice. The whistle is blown on the water valve and the electric circuit is simultaneously closed.

DAMMOND, HOWARD R.

HEAT EXCHANGERS

U.S. Pat. No. 2,879,372

In a water heater, an outer tubular member is provided. An inner tubular member is mounted in the outer member to define a generally toroidal space therebetween. A liquid inlet is adjacent one end of the toroidal space. An outlet is adjacent the other end, the toroidal space affords an impedance to water passage therethrough to establish turbulent flow and to generate a back pressure therein. An electrical resistance heater is in the inner tubular member. The inner tubular member become a heat exchanging surface enveloped by water on all sides. A switch is connected in series with the resistance heater. A means responsive to liquid pressure in the toroidal space generated by the flow of water therethrough actuates the switch to energize the resistance heater. The impedance to flow established by the presence of the exchanging surface within the outer member both generates back pressure to effect energization of the resistance heater and establishes a turbulent flow to enhance the transfer of heat from the heat exchanging surface to the water.

SUMMARY OF THE INVENTION

A primary object of the present invention is to provide a no freeze protection device for an outdoor faucet that will overcome the shortcomings of the prior art devices.

Another object is to provide a no freeze protection device for an outdoor faucet that includes an enclosure for the outdoor faucet and supply a heat source within the enclosure, to prevent water within the outdoor faucet from freezing during cold weather.

An additional object is to provide a no freeze protection device for an outdoor faucet that will utilize a light bulb fixture as the heat source within the enclosure to protect the outdoor faucet.

A further object is to provide a no freeze protection device for an outdoor faucet that is simple and easy to use.

A still further object is to provide a no freeze protection device for an outdoor faucet that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 3 is a front perspective view with parts broken away and in section of a second embodiment of the instant invention installed over an outdoor faucet on an exterior wall of a building.

FIG. 4 is a rear perspective view of the second embodiment with the outdoor faucet broken away from the exterior wall of the building.

FIG. 5 is a front perspective view of a third embodiment of the instant invention installed over an outdoor faucet on an exterior wall of a building.

Similar reference characters denote corresponding features consistently throughout the attached drawings.

DETAILED DESCRIPTION OF THE PREFERRED EMBODIMENTS

Figure 1:
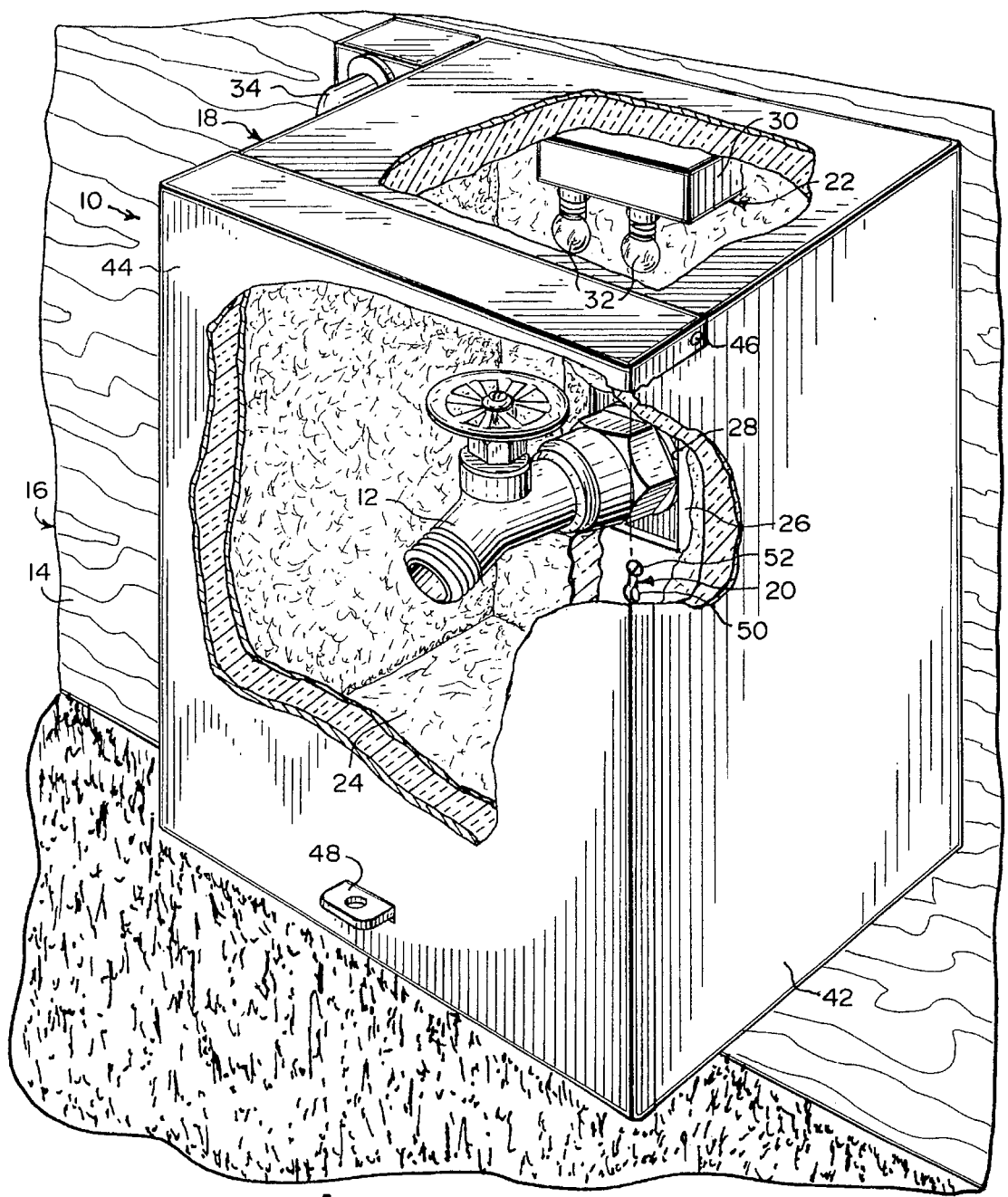
FIG. 1 is a front perspective view with parts broken away and in section of a first embodiment of the instant invention installed over an outdoor faucet on an exterior wall of a building.

Turning now descriptively to the drawings, in which similar reference characters denote similar elements throughout the several views, FIGS. 1 through 5 illustrates a no freeze protection device 10 for an outdoor faucet 12 on an exterior wall 14 of a building 16. The protection device 10 comprises an enclosure 18, to fit about the outdoor faucet 12. A facility 20 is for mounting the enclosure 18 to the exterior wall 14 about the outdoor faucet 12. A component 22 is for supplying heat within the enclosure 18 to the outdoor faucet 12, to prevent water within the outdoor faucet 12 from freezing during cold weather.

The enclosure 18 includes interior insulation 24 thereabout, to help protect the outdoor faucet 12. The enclosure 18 also contains a back plate 26, having an aperture 28 of a size to allow the outdoor faucet 12 to extend within the enclosure 18.

The heat supplying component 22 is a light fixture 30 with at least one light bulb 32 affixed within the enclosure 18. An outlet conduit 34 is on the enclosure 18. An electrical cord 36 connected to the light fixture 30 extends through the outlet conduit 32 to a power supply, such as one hundred and ten volts alternating current.

Figure 2:
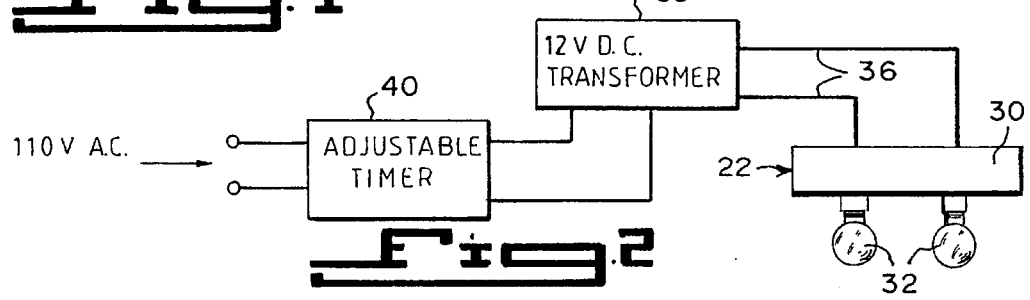
FIG. 2 is a block diagram of an electrical circuit connected to the heat source.

As shown in FIG. 2, a twelve volt direct current transformer 38 is connected to the electrical cord 36 between the light fixture 30 and the power supply. An adjustable timer 40 can also be connected to the electrical cord 36 between the twelve volt direct current transformer 38 and the power supply.

In FIG. 1, the enclosure 18 is a box-shaped casing 42. The casing 42 includes a front door 44 hinged at 46 thereto. The casing 42 further includes a door latch 48 to keep the front door 44 in a closed position thereto. The mounting facility 20 in FIG. 1, consists of the back plate 26 having an enlarged head slot 50 above and below the aperture 28. A pair of fasteners 52 are provided. Each fastener 52 will extend through one enlarged head slot 50 and into the exterior wall 14, to hold the back plate 26 of the enclosure 18 thereto.

The enclosure 18 in FIGS. 3 and 4, is a two step cylindrical shaped casing 54. The mounting facility 20 includes a pair of flat brackets 56. Each bracket 56 has a hole 58 therethrough. The brackets 56 are mounted to the back plate 26 above and below the aperture 28. A pair of fasteners 60 are provided. Each fastener 60 will extend through one hole 58 in one bracket 56 and into the exterior wall 14, to hold the back plate 26 of the enclosure 18 thereto. A temperature gauge 62 can be mounted onto the enclosure 18.

The enclosure 18 in FIG. 5, is a cylindrical shaped casing 64. The casing 64 includes a snap on front cap 66.

OPERATION OF THE INVENTION

To use the no freeze protection device 10, the following steps should be taken:

1. Insert the aperture 28 of the back plate 28 over the outdoor faucet 12.
2. Attach the mounting facility 20 to the exterior wall 14 of the building 16.
3. Plug the electrical cord 36 that is extending from the outlet conduit 34 which is connected to the twelve volt direct current transformer 38 and the adjustable timer 40 to the power source.
4. Illuminate the light bulb 32 in the light fixture 30 within the enclosure 18, so that heat coming from the light bulb 32 will heat the outdoor faucet 12, to prevent freeze up during cold weather.

LIST OF REFERENCE NUMBERS 10 no freeze protection device
12 outdoor faucet
14 exterior wall
16 building
18 enclosure
20 mounting facility
22 heat supplying component
24 interior insulation
26 back plate on 18
28 aperture in 26
30 light fixture for 22
32 light bulb in 30
34 outlet conduit on 18
36 electrical cord
38 twelve volt direct current transformers
40 adjustable timer
42 box-shaped casing for 18
44 front door of 42
46 hinge on 44
48 door latch
50 enlarged head slot of 20
52 fastener of 20
54 two step cylindrical shaped casing for 18
56 flat bracket of 20
58 fastener of 20
60 fastener of 20
62 temperature gauge on 18
64 cylindrical shaped casing for 18
66 snap on front cap on 64

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A no freeze protection device for an outdoor faucet on an exterior wall of a building, said protection device comprising:

a) a mountable and removable enclosure to fit about the outdoor faucet comprising a box-like casing with a back plate having an aperture of a size to allow the outdoor faucet to extend within said enclosure and a hinged front door with a door latch to keep said front door in a closed position, the interior of said casing being lined with insulating material;

b) means for mounting the back plate of said enclosure on the exterior wall about the outdorr faucet with the latter protruding through said aperture into said enclosure and said back plate having an enlarged head slot above and below said aperture within said enclosure and a pair of fasteners each of which extends through an enlarged head slot into the exterior wall to hold said back plate of said enclosure thereto; and c) means for supplying heat within said enclosure to the outdoor faucet to prevent water within the outdoor faucet from freezing during cold weather comprising a light fixture with at least one light bulb affixed within said enclosure, an outlet conduit on said enclosure to allow an electrical cord connected to said light fixture to extend through said outlet conduit to a power supply, and a twelve volt direct current transformer connected to said electrical cord between said light fixture and the power supply.

2. A no freeze protection device as recited in claim 6, further including an adjustable timer connected to said electrical cord between said twelve volt direct current transformer and the power supply.

* * * * *